United States Patent
Yoshimoto et al.

(10) Patent No.: US 10,513,819 B2
(45) Date of Patent: Dec. 24, 2019

(54) WATER/OIL REPELLENT COMPOSITION, METHOD FOR ITS PRODUCTION, AND ARTICLE

(71) Applicant: AGC Inc., Chiyoda-ku (JP)

(72) Inventors: Yukiko Yoshimoto, Chiyoda-ku (JP); Hiroyuki Hara, Chiyoda-ku (JP); Yuuichi Oomori, Chiyoda-ku (JP); Sho Masuda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 106 days.

(21) Appl. No.: 15/714,458

(22) Filed: Sep. 25, 2017

(65) Prior Publication Data

US 2018/0010290 A1   Jan. 11, 2018

Related U.S. Application Data

(63) Continuation of application No. PCT/JP2016/065501, filed on May 25, 2016.

(30) Foreign Application Priority Data

May 27, 2015   (JP) ................................ 2015-106994

(51) Int. Cl.
   *D06M 15/277*   (2006.01)
   *D06M 15/295*   (2006.01)
   *C08F 220/68*   (2006.01)

(52) U.S. Cl.
   CPC ......... *D06M 15/277* (2013.01); *C08F 220/68* (2013.01); *D06M 15/295* (2013.01); *D06M 2200/11* (2013.01); *D06M 2200/12* (2013.01)

(58) Field of Classification Search
   CPC .. D06M 15/277; D06M 15/248; D06M 15/27; D06M 15/295; C08F 220/22; C08F 220/68
   See application file for complete search history.

(56) References Cited

U.S. PATENT DOCUMENTS

| 2003/0130457 A1 | 7/2003 | Maekawa et al. |
| 2010/0069565 A1 | 3/2010 | Hara et al. |
| 2011/0039975 A1 | 2/2011 | Hara et al. |
| 2015/0166863 A1 | 6/2015 | Kaneko et al. |

FOREIGN PATENT DOCUMENTS

| JP | 2009-215370 | 9/2009 |
| JP | 2013-7044 | 1/2013 |
| WO | WO2008/136436 | 11/2008 |
| WO | WO 2008/143299 A1 | 11/2008 |
| WO | WO 2009/145234 A1 | 12/2009 |
| WO | WO 2014/030648 A1 | 2/2014 |

OTHER PUBLICATIONS

International Search Report dated Aug. 2, 2016 in PCT/JP2016/065501, filed on May 25, 2016.

Sherman et al, "Textile Characteristics Affecting the Release of Soil During Laundering Part II: Fluorochemical Soil-Release Textile Finishes", *Text. Res. J.*, (1969) vol. 39, pp. 449-459.

*Primary Examiner* — John E Uselding
(74) *Attorney, Agent, or Firm* — Oblon, McClelland, Maier & Neustadt, L.L.P.

(57) ABSTRACT

To provide a water/oil repellent composition whereby it is possible to obtain an article which is excellent in each of water-repellency, oil-repellency, washing durability, heavy rain durability and texture, a method for producing said composition, and an article which is excellent in each of water-repellency, oil-repellency, washing durability, heavy rain durability and texture. The water/oil repellent composition comprises a copolymer having units based on a monomer (a), units based on a monomer (b) and units based on a monomer (c), and a liquid medium. Monomer (a): a compound represented by $(Z-Y)_nX$ (Z: a $C_{1-6}$ perfluoroalkyl group, etc.; Y: a divalent organic group, etc.; n: 1 or 2; X: a polymerizable unsaturated group). Monomer (b): a (meth)acrylate having no polyfluoroalkyl group and having an alkyl group with at least 20 carbon atoms. Monomer (c): a compound represented by $CH_2=CR^1C(O)O-[(C_2H_4O)_a(C_4H_8O)_b]-H$ ($R^1$: a hydrogen atom or a methyl group, and a/b=1 to 3).

12 Claims, No Drawings

WATER/OIL REPELLENT COMPOSITION, METHOD FOR ITS PRODUCTION, AND ARTICLE

TECHNICAL FIELD

The present invention relates to a water/oil repellent composition, a method for its production and an article treated by using the water/oil repellent composition.

BACKGROUND ART

As a method for imparting water/oil repellency to a surface of an article (such as a fiber product, etc.), a method of treating the article by using a water/oil repellent composition having dispersed in a liquid medium a copolymer having units based on a monomer having a polyfluoroalkyl group, is known. The article treated by using the water/oil repellent composition is required to have such a property (washing durability) that the water repellency is not lowered substantially even when subjected to washing repeatedly and a property (heavy-rain durability) that the water repellency is not lowered substantially even when exposed to heavy rainfall conditions.

As a water/oil repellent composition excellent in washing durability and heavy-rain durability, for example, the following water/oil repellent composition has been proposed.

(1) A water/oil repellent composition comprising a copolymer having units based on following monomer 1 and units based on the following monomer 2 (Patent Document 1), Monomer 1: a (meth)acrylate having a $C_{1-6}$ perfluoroalkyl group, Monomer 2: a (meth)acrylate having a $C_{20-30}$ alkyl group.

As water/oil repellent compositions excellent in antifouling properties and washing durability, for example, the following antifouling compositions have been proposed.

(2) An antifouling composition comprising a copolymer having units based on the following monomer 3, units based on the following monomer 4 and units based on the following monomer 5 (Patent Document 2).

Monomer 3: a (meth)acrylate having a $C_{1-6}$ perfluoroalkyl group.

Monomer 4: a (meth)acrylate having a poly(oxyethylene) chain.

Monomer 5: a (meth)acrylate having a poly(oxyethylene-oxytetramethylene) chain.

(3) An antifouling composition comprising a copolymer having units based on the following monomer 6, units based on the following monomer 7 and units based on the following monomer 8, wherein the proportion of fluorine atoms is at least 15 mass % and less than 45 mass %, a copolymer having units based on the following monomer 6, units based on the following monomer 7 and units based on the following monomer 8, wherein the proportion of fluorine atoms is at least 45 mass %, and a copolymer having units based on the following monomer 6, units based on the following monomer 9 and units based on the following monomer 10 (Patent Document 3).

Monomer 6: a (meth)acrylate having a $C_{4-6}$ polyfluoroalkyl group,

Monomer 7: a (meth)acrylate having an alkyl group with at least 12 carbon atoms, Monomer 8: vinyl chloride or vinylidene chloride, Monomer 9: a (meth)acrylate having a poly(oxyethylene) chain.

Monomer 10: a (meth)acrylate having a poly(oxyethylene-oxytetramethylene) chain.

PRIOR ART DOCUMENTS

Patent Documents

Patent Document 1: WO2008/136436
Patent Document 2: WO2008/143299
Patent Document 3: JP-A-2009-215370

DISCLOSURE OF INVENTION

Technical Problem

However, the article treated by using the water/oil repellent composition of (1) was insufficient in oil repellency.

The article treated by using the water/oil repellent composition of (2) is insufficient in washing durability and texture.

The article treated by using the water/oil repellent composition of (3) is insufficient in washing durability and texture.

The present invention is to provide a water/oil repellent composition, whereby it is possible to obtain an article which is excellent in each of water repellency, oil repellency, washing durability, heavy-rain durability and texture, a method for producing such a water/oil repellent composition, and an article which is excellent in each of water repellency, oil repellency, washing durability, heavy-rain durability and texture.

Solution to Problem

The present invention has the following embodiments.

[1] A water/oil repellent composition comprising a copolymer having units based on the following monomer (a), units based on the following monomer (b) and units based on the following monomer (c), and a liquid medium:

Monomer (a): a compound represented by the following formula (1):

$$(Z—Y)_n X \qquad (1)$$

wherein Z is a $C_{1-6}$ perfluoroalkyl group or a group represented by the following formula (2-1) or a group represented by the following formula (2-2), Y is a divalent organic group having no fluorine atom, or a single bond, n is 1 or 2, and X is, when n is 1, any one of groups represented by the following formulae (3-1) to (3-5), or, when n is 2, any one of groups represented by the following formulae (4-1) to (4-4):

$$C_i F_{2i+1} O(CFX^1 CF_2 O)_j CFX^2— \qquad (2-1)$$

$$C_s F_{2s+1}(CH_2CF_2)_t(CF_2CF_2)_u— \qquad (2-2)$$

wherein i is an integer of from 1 to 6, j is an integer of from 0 to 10, $X^1$ and $X^2$ are each a fluorine atom or a trifluoromethyl group, s is an integer of from 1 to 6, t is an integer of from 1 to 4, and u is an integer of from 1 to 3,

$$—CR=CH_2 \qquad (3-1),$$

$$—C(O)OCR=CH_2 \qquad (3-2),$$

$$—OC(O)CR=CH_2 \qquad (3-3),$$

$$—OCH_2\text{-}\varphi\text{-}CR=CH_2 \qquad (3-4),$$

$$—OCH=CH_2 \qquad (3-5),$$

wherein R is a hydrogen atom, a methyl group or a halogen atom, and φ is a phenylene group, $$-CH[(CH_2)_mCR=CH_2]- \quad (4\text{-}1),$$

$$-CH[-(CH_2)_mC(O)OCR=CH_2]- \quad (4\text{-}2),$$

$$-CH[-(CH_2)_mOC(O)CR=CH_2]- \quad (4\text{-}3),$$

$$-OC(O)CH=CHC(O)O- \quad (4\text{-}4),$$

wherein R is a hydrogen atom, a methyl group or a halogen atom, and m is an integer of from 0 to 4, Monomer (b): a (meth)acrylate having no polyfluoroalkyl group and having an alkyl group with at least 20 carbon atoms, Monomer (c): a compound represented by the following formula (5), $$CH_2=CR^1C(O)O-[(C_2H_4O)_a(C_4H_8O)_b]-H \quad (5),$$

wherein $R^1$ is a hydrogen atom or a methyl group, a is from 3 to 50, b is from 1 to 50, the ratio of a to b (a/b) is from 1 to 3, and the bonding order of $(C_2H_4O)$ units and $(C_4H_8O)$ units is not limited.

[2] The water/oil repellent composition according to [1], wherein relative to units based on all monomers constituting the copolymer, the content proportion of units based on the monomer (a) is from 5 to 40 mass %, the content proportion of units based on the monomer (b) is from 40 to 94.9 mass %, and the content proportion of units based on the monomer (c) is from 0.1 to 20 mass %.

[3] The water/oil repellent composition according to [1] or [2], wherein the copolymer further has units based on the following monomer (d), Monomer (d): a halogenated olefin.

[4] The water/oil repellent composition according to [3], wherein the monomer (d) is vinyl chloride.

[5] The water/oil repellent composition according to [3] or [4], wherein relative to units based on all monomers constituting the copolymer, the proportion of units based on the monomer (d) is at most 30 mass %.

[6] The water/oil repellent composition according to any one of [1] to [5], wherein the copolymer further has units based on the following monomer (e), Monomer (e): a monomer having a crosslinkable functional group.

[7] The water/oil repellent composition according to any one of [1] to [6], wherein the liquid medium is an aqueous medium.

[8] A method for producing a water/oil repellent composition, which comprises polymerizing monomer components comprising the following monomer (a), the following monomer (b) and the following monomer (c) in a liquid medium in the presence of a surfactant and a polymerization initiator, to form a copolymer:

Monomer (a): a compound represented by the following formula (1):

$$(Z-Y)_nX \quad (1)$$

wherein Z is a $C_{1-6}$ perfluoroalkyl group or a group represented by the following formula (2-1) or a group represented by the following formula (2-2), Y is a divalent organic group having no fluorine atom, or a single bond, n is 1 or 2, and X is, when n is 1, any one of groups represented by the following formulae (3-1) to (3-5), or, when n is 2, any one of groups represented by the following formulae (4-1) to (4-4):

$$C_iF_{2i+1}O(CFX^1CF_2O)_jCFX^2- \quad (2\text{-}1)$$

$$C_sF_{2s+1}(CH_2CF_2)_t(CF_2CF_2)_u- \quad (2\text{-}2)$$

wherein i is an integer of from 1 to 6, j is an integer of from 0 to 10, $X^1$ and $X^2$ are each a fluorine atom or a trifluoromethyl group, s is an integer of from 1 to 6, t is an integer of from 1 to 4, and u is an integer of from 1 to 3, $$-CR=CH_2 \quad (3\text{-}1),$$

$$-C(O)OCR=CH_2 \quad (3\text{-}2),$$

$$-OC(O)CR=CH_2 \quad (3\text{-}3),$$

$$-OCH_2\text{-}\varphi\text{-}CR=CH_2 \quad (3\text{-}4),$$

$$-OCH=CH_2 \quad (3\text{-}5),$$

wherein R is a hydrogen atom, a methyl group or a halogen atom, and φ is a phenylene group, $$-CH[(CH_2)_mCR=CH_2]- \quad (4\text{-}1),$$

$$-CH[-(CH_2)_mC(O)OCR=CH_2]- \quad (4\text{-}2),$$

$$-CH[-(CH_2)_mOC(O)CR=CH_2]- \quad (4\text{-}3),$$

$$-OC(O)CH=CHC(O)O- \quad (4\text{-}4),$$

wherein R is a hydrogen atom, a methyl group or a halogen atom, and m is an integer of from 0 to 4, Monomer (b): a (meth)acrylate having no polyfluoroalkyl group and having an alkyl group with at least 20 carbon atoms, Monomer (c): a compound represented by the following formula (5), $$CH_2=CR^1C(O)O-[(C_2H_4O)_a(C_4H_8O)_b]-H \quad (5),$$

wherein $R^1$ is a hydrogen atom or a methyl group, a is from 3 to 50, b is from 1 to 50, the ratio of a to b (a/b) is from 1 to 3, and the bonding order of $(C_2H_4O)$ units and $(C_4H_8O)$ units is not limited.

[9] The method for producing a water/oil repellent composition according to [8], wherein relative to the total amount of the monomer components, the proportion of the monomer (a) is from 5 to 40 mass %, the a proportion of the monomer (b) is from 40 to 94.9 mass %, and the proportion of the monomer (c) is from 0.1 to 20 mass %.

[10] The method for producing a water/oil repellent composition according to [8] or [9], wherein the monomer components further contain the following monomer (d), Monomer (d): a halogenated olefin.

[11] The method for producing a water/oil repellent composition according to any one of [8] to [10], wherein the monomer components further contain the following monomer (e), Monomer (e): a monomer having a crosslinkable functional group.

[12] The method for producing a water/oil repellent composition according to any one of [8] to [11], wherein the liquid medium is an aqueous medium.

[13] An article treated by using the water/oil repellent composition as defined in any one of [1] to [7].

[14] The article according to [13], wherein the article is a fiber product.

Advantageous Effects of Invention

By the water/oil repellent composition of the present invention, it is possible to obtain an article which is excellent in each of water repellency, oil repellency, washing durability, heavy rain durability and texture.

By the method for producing a water/oil repellent composition of the present invention, it is possible to produce a water and oil repellent composition, whereby it is possible to obtain an article which is excellent in each of water repellency, oil repellency, washing durability, heavy-rain durability and texture.

The article of the present invention is excellent in each of water repellency, oil repellency, washing durability, heavy rain durability and texture.

DESCRIPTION OF EMBODIMENTS

In the present specification, a compound represented by formula (1) will be referred to as a compound (1). Compounds represented by other formulae will be referred to in the same manner.

In the present specification, a group represented by the formula (2) will be referred to as a group (2). Groups represented by other formulae will be referred to in the same manner.

In the present specification, the meanings of the following terms are as follows.

A "(meth)acrylate" is a generic term for an acrylate and a methacrylate.

A "monomer" means a compound having a polymerizable unsaturated group.

A "polyfluoroalkyl group" means a group having some or all of hydrogen atoms of an alkyl group substituted by fluorine atoms. Hereinafter, a "polyfluoroalkyl group" may be referred to also as a "$R^f$ group".

A "perfluoroalkyl group" means a group having all of hydrogen atoms of an alkyl group substituted by fluorine atoms. Hereinafter, a "perfluoroalkyl group" may be referred to also as a "$R^F$ group".

A "number average molecular weight" and a "mass average molecular weight" of a copolymer are values obtained as calculated as polystyrene by a gel permeation chromatography (GPC) method.

In a $[(C_2H_4O)_a(C_4H_8O)_b]$ chain of the monomer (c), "a" and "b" are, respectively, average numbers of units of oxyethylene units and oxytetramethylene units and values calculated by a nuclear magnetic resonance spectroscopy (NMR).

A "number average molecular weight" of a $[(C_2H_4O)_a(C_4H_8O)_b]$ chain of the monomer (c) is a value obtained by summing a value obtained by multiplying the average number of units to the molecular weight of oxyethylene units, and a value obtained multiplying the average number of units to the molecular weight of tetramethylene units.

<Water/Oil Repellent Composition>

The water/oil repellent composition of the present invention comprises a specific copolymer and a liquid medium as essential components and may contain, as the case requires, a surfactant and additives.

(Copolymer)

The copolymer has units based on monomer (a), units based on monomer (b) and units based on monomer (c).

The copolymer preferably further has units based on monomer (d) and/or units based on monomer (e).

The copolymer may contain, as the case requires, units based on monomer (f).

Monomer (a):

Monomer (a) is a compound (1).

$$(Z-Y)_n X \qquad (1).$$

Z is a $C_{1-6}$ $R^F$ group, a group represented by the following formula (2-1), or a group represented by the following formula (2-2).

$$C_i F_{2i+1} O(CFX^1 CF_2 O)_j CFX^2 - \qquad (2-1)$$

$$C_s F_{2s+1}(CH_2 CF_2)_t (CF_2 CF_2)_u - \qquad (2-2)$$

wherein i is an integer of from 1 to 6, j is an integer of from 0 to 10, $X^1$ and $X^2$ are each a fluorine atom or a trifluoromethyl group, s is an integer from 1 to 6, t is an integer from 1 to 4, and u is an integer of from 1 to 3.

The number of carbon atoms in the $R^F$ group is preferably from 4 to 6. The $R^F$ group may be linear or may be branched, and is preferably linear.

Z may, for example, be $F(CF_2)_4-$, $F(CF_2)_5-$, $F(CF_2)_6-$, $(CF_3)_2 CF(CF_2)_2-$, etc.

Y is a divalent organic group having no fluorine atom, or a single bond.

The divalent organic group is preferably an alkylene group. The alkylene group may be linear or may be branched. The alkylene group may have $-O-$, $-NH-$, $-CO-$, $-SO_2-$, $-S-$, $-CD^1=CD^2-$ (wherein $D^1$ and $D^2$ are each a hydrogen atom or a methyl group.), $-\varphi-OCO-$, etc.

Y may, for example, be $-CH_2-$, $-CH_2CH_2-$, $-(CH_2)_3-$, $-CH_2CH_2CH(CH_3)-$, $-CH=CH-CH_2-$, $-S-CH_2CH_2-$, $-SO_2-CH_2CH_2-$, $-CH_2CH_2CH_2-S-CH_2CH_2-$, $-CH_2CH_2CH_2-SO_2-CH_2CH_2-$, $-\varphi-OCO-CH_2CH_2-$, etc.

n is 1 or 2.

X is, when n is 1, any one of group (3-1) to group (3-5), or when n is 2, any one of group (4-1) to group (4-4).

$$-CR=CH_2 \qquad (3-1),$$

$$-C(O)OCR=CH_2 \qquad (3-2),$$

$$-OC(O)CR=CH_2 \qquad (3-3),$$

$$-OCH_2-\varphi-CR=CH_2 \qquad (3-4),$$

$$-OCH=CH_2 \qquad (3-5),$$

wherein R is a hydrogen atom, a methyl group or a halogen atom, and $\varphi$ is a phenylene group, and as R, a hydrogen atom, a methyl group or a chlorine atom is preferred.

$$-CH[(CH_2)_m CR=CH_2]- \qquad (4-1),$$

$$-CH[-(CH_2)_m C(O)OCR=CH_2]- \qquad (4-2),$$

$$-CH[-(CH_2)_m OC(O)CR=CH_2]- \qquad (4-3),$$

$$-OC(O)CH=CHC(O)O- \qquad (4-4),$$

wherein R is a hydrogen atom, a methyl group or a halogen atom, and m is an integer of from 0 to 4, and as R, a hydrogen atom, a methyl group or a chlorine atom is preferred.

From the viewpoint of the polymerizability with other monomers, the flexibility of the coating film of the copolymer, the adhesion of the copolymer to an article, the dispersibility or solubility in the liquid medium, easiness of emulsion polymerization, the compound (1) is preferably an acrylate, a methacrylate or an acrylate with its α-position substituted by a halogen atom, which has a $C_{1-6}$ $R^F$ group, or an acrylate or a methacrylate, which has a group (2-2), more preferably an acrylate, a methacrylate or an acrylate with its α-position substituted by a halogen atom, which has a $C_{4-6}$ $R^F$ group.

As the compound (1), particularly preferred is a compound wherein Z is a $C_{4-6}$ $R^F$ group, Y is a $C_{1-4}$ alkylene group, n is 1, X is a group (3-3), and R is a hydrogen atom, a methyl group or a chlorine atom.

Preferred specific examples of the compound (1) include $C_6F_{13}C_2H_4OCOC(CH_3)=CH_2$, $C_6F_{13}C_2H_4OCOCH=CH_2$, $C_6F_{13}C_2H_4OCOCCl=CH_2$, $C_4F_9C_2H_4OCOC(CH_3)=CH_2$, $C_4F_9C_2H_4OCOCH=CH_2$, $C_4F_9C_2H_4OCOCCl=CH_2$,
$C_4F_9CH_2CF_2C_4F_8C_2H_4OCOCH=CH_2$,
$C_4F_9CH_2CF_2C_4F_8C_2H_4OCOC(CH_3)=CH_2$,
$C_6F_{13}C_2H_4OCO\varphi OCOCH=CH_2$, $C_4F_8C_2H_4OCO$ (POCOCH=CH_2$, etc.

Monomer (b):

The monomer (b) is a (meth)acrylate having no $R^f$ group and having an alkyl group with at least 20 carbon atoms. The number of carbon atoms in the alkyl group is preferably from 20 to 30, more preferably from 20 to 24.

When the number of carbon atoms in the alkyl group is at least the above lower limit value, the washing durability and heavy-rain durability of the article treated by using the water/oil repellent composition will be good. When the number of carbon atoms in the alkyl group is at most the above upper limit value, handling in polymerization operation is easy, and it is possible to obtain a copolymer in good yield.

As the monomer (b), behenyl (meth)acrylate or eicosyl (meth)acrylate is preferred, and behenyl acrylate is particularly preferred.

Monomer (c):

The monomer (c) is a compound (5).

$$CH_2=CR^1C(O)O-[(C_2H_4O)_a(C_4H_8O)_b]-H \tag{5}$$

$R^1$ is a hydrogen atom or a methyl group, and a methyl group is preferred from such a viewpoint that the oil repellency of the article treated by using the water/oil repellent composition will be further improved.

a is from 3 to 50, more preferably from 3 to 20. When a is at least the lower limit value in the above range, oil repellency of the article treated by using the water/oil repellent composition will be good. When a is at most the upper limit value in the above range, water repellency of the article treated by using the water/oil repellent composition will be good.

b is from 1 to 50, more preferably from 2 to 20. When b is at least the lower limit value in the above range, water repellency of the article treated by using the water/oil repellent composition will be good. When b is at most the upper limit value in the above range, oil repellency of the article treated by using the water/oil repellent composition will be good.

The ratio of a to b (a/b) is from 1 to 3, more preferably from 1.5 to 2.5. When a/b is at least the lower limit value in the above range, oil repellency of the article treated by using the water/oil repellent composition will be good. When a/b is at most the upper limit value in the above range, water repellency of the article treated by using the water/oil repellent composition will be good.

The number average molecular weight of $[(C_2H_4O)_a(C_4H_8O)_b]$ is preferably from 200 to 6,000, more preferably from 300 to 2,000. When the number average molecular weight of $[(C_2H_4O)_a(C_4H_8O)_b]$ is at least the lower limit value in the above range, oil repellency of the article treated by using the water/oil repellent composition will be good. When the number average molecular weight of $[(C_2H_4O)_a(C_4H_8O)_b]$ is at most the upper limit value in the above range, water repellency of the article treated by using the water/oil repellent composition will be further improved.

In $[(C_2H_4O)_a(C_4H_8O)_b]$, the bonding order of a mole of $(C_2H_4O)$ units and b mole of $(C_4H_8O)$ units is not limited. For example, $(C_2H_4O)$ units and $(C_4H_8O)$ units may be arranged randomly, or $(C_2H_4O)$ units and $(C_4H_8O)$ units may be arranged alternately. Otherwise, a block consisting of a plurality of $(C_2H_4O)$ units and a block consisting of a plurality of $(C_4H_8O)$ units may be linked. From such a viewpoint that the oil repellency of the article treated by using the water/oil repellent composition will be further improved, it is preferred that $(C_2H_4O)$ units and $(C_4H_8O)$ units are randomly arranged.

$(C_2H_4O)$ units and $(C_4H_8O)$ units may be linear or may be branched. From such a viewpoint that the effect of the present invention can be sufficiently exhibited, they are preferably linear.

As the copolymer has units based on the monomer (c), it is capable of sufficiently exhibiting oil repellency, washing durability and heavy-rain durability.

This is considered to be attributable to that a monomer having $(C_2H_4O)$ units and $(C_4H_8O)$ units has a lower glass transition temperature than a monomer having only $(C_2H_4O)$ units, and consequently, the glass transition temperature of a copolymer having units derived from a monomer having $(C_2H_4O)$ units and $(C_4H_8O)$ units will be lowered, whereby the film-forming properties will be improved, and the adhesion to a substrate will be improved. Further, it is considered that the monomer having $(C_2H_4O)$ units and $(C_4H_8O)$ units is oleophobic as well as hydrophobic, whereby it does not inhibit water repellency and oil repellency of the copolymer.

Monomer (d):

The monomer (d) is a halogenated olefin.

By a combination of units based on the monomer (b) and units based on the monomer (d), the adhesion with an article will be improved, whereby washing durability and heavy-rain durability of the article treated by using the water/oil repellent composition will be further improved.

The halogenated olefin may be a compound represented by the following formula (6).

$$R^4R^5C=CR^6R^7 \tag{6}$$

$R^4$, $R^5$, $R^6$ and $R^7$ are each independently a hydrogen atom, a halogen atom or a $C_{1-3}$ perfluoroalkyl group. However, at least one among $R^4$, $R^5$, $R^6$ and $R^7$ is a halogen atom or a $C_{1-3}$ perfluoroalkyl group. The perfluoroalkyl group is $CF_3-$, $C_2F_5-$ or $C_3F_7-$.

As the halogenated olefin, a chlorinated olefin or a fluorinated olefin is preferred.

As the halogenated olefin, tetrafluoroethylene or a compound represented by the following formula (7) is preferred.

$$R^8HC=CR^9R^{10} \tag{7}$$

$R^8$, $R^9$ and $R^{10}$ are each independently a hydrogen atom, a chlorine atom, a fluorine atom or a $C_{1-3}$ perfluoroalkyl group. However, at least one of $R^8$, $R^9$ and $R^{10}$ is a chlorine atom, a fluorine atom or a $C_{1-3}$ perfluoroalkyl group.

Specific examples of the halogenated olefin include vinyl chloride, vinylidene chloride, tetrafluoroethylene, vinylidene fluoride, 2,3,3,3-tetrafluoro-1-propene, 1-chloro-3,3,3-trifluoropropene (E form), 1-chloro-3,3,3-trifluoropropene (Z form), trifluoroethylene, 1,2-difluoroethylene (E form), 1,2-difluoroethylene (Z form), 1-chloro-2,3,3,3-tetrafluoro-1-propene (E form), 1-chloro-2,3,3,3-tetrafluoro-1-propene (Z form), etc. Among them, vinyl chloride, vinylidene chloride, tetrafluoroethylene, vinylidene fluoride or 2,3,3,3-tetrafluoro-1-propene is preferred, and from the viewpoint of adhesion to an article, vinyl chloride, vinylidene chloride or 2,3,3,3-tetrafluoro-1-propene is more preferred.

Monomer (e):

The monomer (e) is a monomer having a crosslinkable functional group (excluding the monomer (c)).

When the copolymer has units based on the monomer (e), the durability (washing durability, heavy-rain durability) of the article treated by using the water/oil repellent composition will be further improved.

The crosslinkable functional group is preferably a functional group having at least one bond among a covalent bond, an ionic bond and a hydrogen bond, or a functional group capable of forming a crosslinked structure by interaction of such bonds.

The functional group is preferably an isocyanate group, a blocked isocyanate group, an alkoxysilyl group, an amino group, an alkoxymethyl amide group, a silanol group, an ammonium group, an amide group, an epoxy group, a hydroxy group, an oxazoline group, a carboxy group, an alkenyl group, a sulfonic acid group, etc. In particular, an epoxy group, a hydroxy group, a blocked isocyanate group, an alkoxysilyl group, an amino group or a carboxy group is preferred.

As the monomer (e), a (meth)acrylate, an acrylamide, a vinyl ether or a vinyl ester is preferred.

As the monomer (e), more preferred is N-methylol (meth) acrylamide, N-butoxymethyl (meth)acrylamide, 2-hydroxyethyl (meth)acrylate, 4-hydroxybutyl (meth)acrylate, a 3,5-dimethylpyrazole adduct of 2-isocyanatoethyl (meth) acrylate, a 3,5-dimethylpyrazole adduct of 3-isocyanatopropyl (meth)acrylate, diacetone acrylamide, glycidyl methacrylate, glycerol (meth)acrylate, 3-chloro-2-hydroxypropyl (meth)acrylate, a polycaprolactone ester of hydroxyethyl (meth)acrylate, phenyl glycidyl ethyl acrylate tolylene diisocyanate (AT-600, manufactured by Kyoeisha Chemical Co., Ltd.) or 3-(methyl ethyl ketoxime) isocyanatomethyl-3,5,5-trimethylcyclohexyl (2-hydroxyethylmethacrylate) cyanate (Tech Coat HE-6P, manufactured by Kyokenkasei).

As the monomer (e), particularly preferred is N-methylol (meth)acrylate, 2-hydroxyethyl (meth)acrylate, 4-hydroxybutyl (meth)acrylate, a 3,5-dimethyl pyrazole adduct of 2-isocyanatoethyl (meth)acrylate, or a 3,5-dimethylpyrazole adduct of 3-isocyanatopropyl (meth)acrylate, or 3-chloro-2-hydroxypropyl (meth)acrylate.

Monomer (f):

The monomer (f) is a monomer other than the monomer (a), the monomer (b), the monomer (c), the monomer (d) and the monomer (e).

As the monomer (f), the following compounds may be mentioned.

Methyl acrylate, ethyl acrylate, propyl acrylate, butyl methacrylate, cyclohexyl (meth)acrylate, 2-ethylhexyl (meth)acrylate, butyl methacrylate, n-hexyl (meth)acrylate, lauryl (meth)acrylate, cetyl (meth)acrylate, stearyl (meth) acrylate, vinyl acetate, vinyl propionate, butene, isoprene, butadiene, ethylene, propylene, vinyl ethylene, pentene, ethyl-2-propylene, butyl ethylene, cyclohexyl propyl ethylene, decyl ethylene, dodecyl ethylene, hexene, isohexyl ethylene, neopentyl ethylene, (1,2-diethoxycarbonyl) ethylene, (1,2-dipropoxycarbonyl) ethylene, methoxy ethylene, ethoxy ethylene, butoxy ethylene, 2-methoxy propylene, pentyl oxyethylene, cyclopentanoyloxy ethylene, cyclopentyl acetoxy ethylene, styrene, α-methyl styrene, p-methyl styrene, hexyl styrene, octyl styrene, nonyl styrene, chloroprene.

N,N-dimethyl (meth)acrylamide, a vinyl alkyl ether, a vinyl alkyl ketone, butyl acrylate, propyl methacrylate, benzyl (meth)acrylate, octyl (meth)acrylate, decyl methacrylate, cyclododecyl acrylate, 3-ethoxypropyl acrylate, methoxy-butyl acrylate, 2-ethyl butyl acrylate, 1,3-dimethylbutyl acrylate, 2-methyl pentyl acrylate, aziridinyl ethyl (meth)acrylate, a 2-ethylhexyl polyoxyalkylene (meth)acrylate, polyethylene glycol mono(meth)acrylate, polypropylene glycol mono(meth)acrylate, a polyoxyalkylene glycol di(meth)acrylate.

A crotonic acid alkyl ester, a maleic acid alkyl ester, a fumaric acid alkyl ester, a citraconic acid alkyl ester, a mesaconic acid alkyl ester, triallyl cyanurate, allyl acetate, N-vinyl carbazole, maleimide, N-methyl maleimide, a (meth)acrylate having silicone in its side chain, a (meth) acrylate having an urethane bond, a (meth) acrylate having a polyoxyalkylene chain and having a terminal $C_1$-4 alkyl group, an alkylene di(meth)acrylate, etc.

From the viewpoint of water/oil repellency, it is preferred that the copolymer does not have, as units constituting the (oxyalkylene) chain, units based on a monomer having only $(C_2H_4O)$ units, a monomer having only $(C_3H_6O)$ units, or a monomer having only $(C_2H_4O)$ units and $(C_3H_6O)$ units.

If the copolymer contains units based on a monomer having only $(C_2H_4O)$ units, a monomer having only $(C_3H_6O)$ units, or a monomer having only $(C_2H_4O)$ units and $(C_3H_6O)$ units, the content should be within a range not to lower the water/oil repellency of the copolymer. The content is preferably from 0.1 to 3 mass % relative to units based on all monomers constituting the copolymer.

The proportion of units based on the monomer (a) is, from the viewpoint of water/oil repellency and durability of the article treated by using the water/oil repellent composition, preferably from 5 to 40 mass %, more preferably from 10 to 25 mass %, relative to units based on all monomers constituting the copolymer.

The proportion of units based on the monomer (b) is, from the viewpoint of water/oil repellency and durability of the article treated by using the water/oil repellent composition, preferably from 40 to 94.9 mass %, more preferably from 40 to 91.9 mass %, further preferably from 40 to 91.8 mass % by weight, particularly preferably from 40 to 89.9 mass %, most preferably from 40 to 84.9 mass %, relative to units based on all monomers constituting the copolymer.

The proportion of units based on the monomer (c) is, from the viewpoint of water/oil repellency and durability of the article treated by using the water/oil repellent composition, preferably from 0.1 to 20 mass %, more preferably from 0.1 to 10 mass %, relative to units derived from all monomers constituting the copolymer.

The proportion of units based on the monomer (d) is, from the viewpoint of water/oil repellency and durability of the article treated by using the water/oil repellent composition, preferably from 0 to 30 mass %, more preferably from 3 to 25 mass %, relative to units based on all monomers constituting the copolymer.

The proportion of units based on the monomer (e) is, from the viewpoint of water/oil repellency and durability of the article treated by using the water/oil repellent composition, preferably from 0 to 20 mass %, more preferably from 0.1 to 10 mass %, relative to units based on all monomers constituting the copolymer.

The proportion of units based on the monomer (f) is, from the viewpoint of water/oil repellency and durability of the article treated by using the water/oil repellent composition, preferably from 0 to 35 mass %, more preferably from 0 to 20 mass %, relative to units based on all monomers constituting the copolymer.

The proportion of units based on a monomer in the present invention is calculated based on the charged amount of the monomer during the production of the copolymer.

The mass average molecular weight (Mw) of the copolymer is preferably from 8,000 to 1,000,000, more preferably from 10,000 to 800,000. When the mass-average molecular weight (Mw) of the copolymer is within the above range, both water repellency and oil repellency will be provided.

The number average molecular weight (Mn) of the copolymer is preferably from 3,000 to 800,000, more preferably from 5,000 to 600,000. When the number average molecular weight (Mn) of the copolymer is within the above range, both water repellency and oil repellency will be provided.

(Liquid Medium)

The liquid medium may, for example, be water, an alcohol, a glycol, a glycol ether, a glycol ester, a halogenated compound, a hydrocarbon, a ketone, an ester, an ether, a nitrogen compound, a sulfur compound, an inorganic solvent, an organic acid, etc. and from the viewpoint of dissolution efficiency and handling efficiency, an aqueous medium is preferred.

The aqueous medium means water, a water-soluble organic solvent or a mixed medium thereof. As the water-soluble organic solvent, at least one member selected from the group consisting of a water-soluble mono-alcohol, a water soluble glycol, a water-soluble glycol ether and a water-soluble glycol ester, is preferred.

As the liquid medium, one type may be used alone, or two or more types may be used in combination. When two or more liquid media are used as mixed, it is preferred to use water and a water-soluble organic solvent as mixed. By using an aqueous medium having water and a water-soluble organic solvent as mixed, it is easy to control the solubility or dispersibility of the copolymer, and it is easy to control the permeability, wettability, solvent drying speed, etc. to an article during processing.

The aqueous medium in the water/oil repellent composition of the present invention is preferably water alone, or an aqueous medium comprising water and an aqueous medium containing the above-mentioned water-soluble organic solvent. The amount of the water-soluble organic solvent in the water/oil repellent composition of the present invention, is preferably from 0 to 40 mass %, more preferably from 1 to 20 mass %, in a case of the composition containing 20 mass % of the copolymer.

(Surfactant)

The surfactant may be a hydrocarbon surfactant or a fluorinated surfactant, and each may be an anionic surfactant, a nonionic surfactant, a cationic surfactant or an amphoteric surfactant.

As the surfactant, from the viewpoint of compatibility with additives, a combined use of a nonionic surfactant and an amphoteric surfactant is preferred, and from the viewpoint of the stability of the copolymer, a single use of a nonionic surfactant alone, or a combined use of a nonionic surfactant and a cationic surfactant, is preferred.

The ratio of the nonionic surfactant to the cationic surfactant (nonionic surfactant/cationic surfactant) is preferably from 97/3 to 40/60 (mass ratio).

The nonionic surfactant is preferably at least one member selected from the group consisting of surfactants $s^1$ to $s^6$ disclosed in WO2010/047258 and WO2010/123042 and amidoamine surfactants disclosed in Japanese Patent No. 5569614.

In a case where the surfactant contains a cationic surfactant, as the cationic surfactant, surfactant $s^7$ disclosed in WO2010/047258 and WO2010/123042 is preferred.

In a case where the surfactant contains an amphoteric surfactant, as the amphoteric surfactant, surfactant $s^8$ disclosed in WO2010/047258 and WO2010/123042 is preferred.

Further, as the surfactant, surfactant $s^9$ (polymer surfactant) disclosed in WO2010/047258 and WO2010/123042 may be used.

Preferred embodiments of the surfactant are the same as the preferred embodiments disclosed in WO2010/047258 and WO2010/123042.

Preferred specific examples of the nonionic surfactant include the following compounds.

$C_{18}H_{37}O[CH_2CH(CH_3)O]_2$—$(CH_2CH_2O)_{30}H$,
$C_{18}H_{35}O$—$(CH_2CH_2O)_{26}H$,
$C_{18}H_{35}O$—$(CH_2CH_2O)_{30}H$,
$C_{16}H_{33}O[CH_2CH(CH_3)O]_5$—$(CH_2CH_2O)_{20}H$,
$C_{12}H_{25}O[CH_2CH(CH_3)O]_2$—$(CH_2CH_2O)_{15}H$,
$(C_8H_{17})(C_6H_{13})CHO$—$(CH_2CH_2O)_{15}H$,
$C_{10}H_{21}O[CH_2CH(CH_3)O]_2$—$(CH_2CH_2O)_{15}H$,
$C_6F_{13}CH_2CH_2O$—$(CH_2CH_2O)_{15}H$,
$C_6F_{13}CH_2CH_2O[CH_2CH(CH_3)O]_2$—$(CH_2CH_2O)_{15}H$,
$C_4F_9CH_2CH_2O[CH_2CH(CH_3)O]_2$—$(CH_2CH_2O)_{15}H$.
$HO$—$(CH_2CH_2O)_{15}$—$(C_3H_6O)_{35}$—$(CH_2CH_2O)_{15}H$,
$HO$—$(CH_2CH_2O)_8$—$(C_3H_6O)_{35}$—$(CH_2CH_2O)_8H$,
$HO$—$(CH_2CH_2O)_9$—$(C_3H_6O)_{20}$—$(CH_2CH_2O)_9H$,
$HO$—$(CH_2CH_2O)_{45}$—$(C_3H_6O)_{17}$—$(CH_2CH_2O)_{45}H$,
$HO$—$(CH_2CH_2O)_{34}$—$(CH_2CH_2CH_2CH_2O)_{28}$—$(CH_2CH_2O)_{34}H$.
$CH_3$ $(CH_2)_m$—$CH[O(CH_2CH_2O)_s$ $H]$—$(CH_2)_n CH_3$, wherein m+n is an integer of from 9 to 11, and s is an integer of from 3 to 15.

Preferred specific examples of the cationic surfactant include stearyl trimethyl ammonium chloride, stearyl dimethyl monoethyl ammonium ethyl sulfate, stearyl monomethyl di(polyethylene glycol) ammonium chloride, fluorohexyl trimethyl ammonium chloride, di(tallow alkyl) dimethyl ammonium chloride, dimethyl mono coconut amine acetate, amidoamine quaternary ammonium salts disclosed in Japanese Patent No. 5569614, etc.

Preferred specific examples of the amphoteric surfactant include dodecyl betaine, stearyl betaine, dodecyl carboxymethyl hydroxyethyl imidazolinium betaine, dodecyl dimethylamino acetic acid betaine, fatty acid amidopropyl dimethylamino acetic acid betaine, etc.

The total amount of surfactants is preferably from 1 to 10 parts by mass, more preferably from 2 to 8 parts by mass, relative to 100 parts by mass of the copolymer.

(Additives)

The additives include a penetrating agent, a defoaming agent (silicone defoaming agent, etc.), a water-absorbing agent, an antistatic agent, an anticrease agent, a texture modifier, a film-forming assistant, a water-soluble polymer (poly acrylamide, polyvinyl alcohol, etc.), a thermosetting agent (a melamine curing agent such as methylol melamine, an isocyanate curing agent such as blocked polyisocyanate), an epoxy curing agent (isophthalic acid dihydrazide, adipic acid dihydrazide, sebacic acid dihydrazide, dodecanoic diacid dihydrazide, 1,6-hexamethylene bis(N,N-dimethyl semicarbazide), 1,1,1',1'-tetramethyl-4,4'-(methylene-di-para-phenylene)disemicarbazide, Spiro glycol, etc.), a carbodiimide group-containing curing agent, an oxazoline group-containing curing agent, a thermosetting catalyst, a crosslinking catalyst, a synthetic resin, a fiber stabilizer, triethanolamine, acetic acid, colloidal silica, etc.

(Method for Producing Water/Oil Repellent Composition)

The method for producing a water/oil repellent composition of the present invention is a method of polymerizing monomer components comprising the above monomer (a), the above monomer (b) and the above monomer (c) in a liquid medium in the presence of a surfactant and a polymerization initiator, to form a copolymer. Further, it is possible to further use at least one member of the above monomer (d), the above monomer (e) and the above monomer (f), as a monomer component.

The water/oil repellent composition of the present invention may be produced, for example, by the following method (i) or (ii).

(i) A method of polymerizing monomer components comprising the monomers (a) to (c) and, as the case requires, the monomers (d) to (f) in a liquid medium in the presence of a surfactant and a polymerization initiator, to obtain a solution, dispersion or emulsion of a copolymer, and then, as the case requires, adding a liquid medium, a surfactant and additives.

(ii) A method of polymerizing monomer components comprising the monomers (a) to (c) and, as the case requires, the monomers (d) to (f) in a liquid medium in the presence of a surfactant and a polymerization initiator, to obtain a solution, dispersion or emulsion of a copolymer, then separating the copolymer, and adding a liquid medium, a surfactant, and, as the case requires, additives.

The polymerization method may, for example, be a dispersion polymerization method, an emulsion polymerization method, a suspension polymerization method, etc.

As the method for producing a water/oil repellent composition, preferred is a method of emulsion-polymerizing monomer components comprising the monomers (a) to (c) and, as the case requires, the monomers (d) to (f) in an aqueous medium in the presence of a surfactant and a polymerization initiator, to obtain an emulsion of a copolymer.

With a view to improving the yield of the copolymer, it is preferred to pre-emulsify a mixture comprising the monomers, a surfactant and an aqueous medium, prior to the emulsion polymerization, For example, a mixture comprising the monomers, a surfactant and an aqueous medium, is mixed and dispersed by a homomixer or a high pressure emulsifier. Further, a gaseous monomer may be added to the emulsified mixture obtained by the pre-emulsification and copolymerized with the monomers in the emulsified mixture.

As the polymerization initiator, a thermal polymerization initiator, a photopolymerization initiator, a radiation polymerization initiator, a radical polymerization initiator, an ionic polymerization initiator, etc. may be mentioned, and a water-soluble or oil-soluble radical polymerization initiator is preferred.

As the radical polymerization initiator, a common initiator such as an azo polymerization initiator, a peroxide polymerization initiator, or a redox initiator may be used depending on the polymerization temperature. As the radical polymerization initiator, an azo compound is particularly preferred, and in a case where the polymerization is carried out in an aqueous medium, a salt of an azo compound is more preferred. The polymerization temperature is preferably from 20 to 150° C.

In the polymerization of the monomers, a molecular weight modifier may be used. As the molecular weight modifier, an aromatic compound, a mercapto alcohol or a mercaptan is preferred, and an alkyl mercaptan is particularly preferred. As the molecular weight modifier, mercaptoethanol, mercapto glycerol, n-octyl mercaptan, n-dodecyl mercaptan, t-dodecyl mercaptan, stearyl mercaptan, α-methylstyrene dimer ($CH_2$=$C(Ph)CH_2C(CH_3)_2Ph$, wherein Ph is a phenyl group), etc. may be mentioned.

The proportions of monomer (a) to (f) are, since substantially no residual monomers are detected after polymerization, the same as the proportions of units based on the above monomers (a) to (f), respectively, and the preferred embodiments are also the same.

In the water/oil repellent composition of the present invention, it is preferred that the copolymer is dispersed as particles in the liquid medium. The average particle size of the copolymer is preferably from 10 to 1,000 nm, more preferably from 10 to 500 nm, particularly preferably from 50 to 300 nm. When the average particle size is within such a range, it is not necessary to use a surfactant or the like in a large amount, the water/oil repellency is good, color dulling will not occur when a dyed fabric is treated, and dispersed particles can exist stably in the liquid medium without precipitation. The average particle size of the copolymer can be measured by a dynamic light scattering apparatus, an electron microscope, etc.

The solid content concentration of the water/oil repellent composition of the present invention is preferably from 25 to 40 mass % immediately after the production of the water/oil repellent composition.

The solid content concentration of the water/oil repellent composition of the present invention is preferably from 0.2 to 5 mass % at the time of treating an article.

The solid content concentration of the water/oil repellent composition is calculated from the mass of the water/oil repellent composition before heating and the mass after drying for 4 hours at 120° C. in a convection dryer.

Advantageous Effects

The water/oil repellent composition of the present invention as described above, contains a copolymer having, in addition to units based on the monomer (a) and units based on the monomer (b), further units based on the monomer (c), whereby by treating an article by using such a water/oil repellent composition, it is possible to obtain the article excellent in each of water repellency, oil repellency, washing durability, heavy-rain durability and texture.

Further, in the water/oil repellent composition of the present invention, the copolymer does not have units based on a monomer having a $R^F$ group with 7 or more carbon atoms, whereby it is possible to bring the content (the content in the case of a solid concentration of 20%) of perfluorooctanoic acid (PFOA) or perfluorooctane sulfonic acid (PFOS) and precursors thereof, of which an influence to environment has been pointed out, to be below the detection limit as an analytical value of LC-MS/MS according to the method disclosed in WO2009/081822.

<Article>

The article of the present invention is an article treated by using the water/oil repellent composition of the present invention.

The article to be treated with the water/oil repellent composition of the present invention may, for example, be fibers (natural fibers, synthetic fibers, blended fibers, etc.), fiber products, non-woven fabrics, resin products, paper, leather products, wood, metal products, stone materials, concrete products, gypsum products, glass products, etc. As the article, a fiber product is particularly preferred.

The treating method may, for example, be a method of applying or impregnating the water/oil repellent composition to an article by a known coating method, followed by drying.

When the article is treated by using the water/oil repellent composition of the present invention, the coating film becomes flexible, whereby in the case of a fiber product, the texture becomes flexible, and it becomes possible to impart high quality water/oil repellency to the article. Also, adhesion of the coating film will be excellent, whereby the water/oil repellency can be imparted even by curing at a low temperature. Further, a decrease in performance due to friction or washing is less, whereby initial performance in the processing can be stably maintained. Further, when treatment is applied to paper, even under low temperature drying conditions, excellent sizing properties, water repellency and oil resistance can be imparted to the paper. When treatment is applied to e.g. a resin, glass or metal surface, it is possible to form a water/oil repellent coating film which is good in adhesion to an article and is excellent in film-forming properties.

EXAMPLES

Now, the present invention will be described in detail with reference to Examples, but the present invention is not limited thereto.

Ex. 1 to 4 are Examples of the present invention, and Ex. 5 to 13 are Comparative Examples.

(Oil Repellency)

With respect to a test cloth, oil repellency was evaluated in accordance with the test method of AATCC-TM118-1966. Oil repellency was represented by the grades shown in Table 1. A grade marked with +(−) indicates that the property is slightly better (worse).

TABLE 1

| Oil repellency No. | Test solution | Surface tension (25° C.) [mN/m] |
|---|---|---|
| 8 | n-heptane | 19.8 |
| 7 | n-octane | 21.4 |
| 6 | n-decane | 23.5 |
| 5 | n-dodecane | 24.7 |
| 4 | n-tetradecane | 26.4 |
| 3 | n-hexadecane | 27.3 |
| 2 | 65 parts of Nujol/35 parts of hexadecane | 29.6 |
| 1 | Nujol | 31.2 |
| 0 | Less than 1 | — |

(Friction Durability of Oil Repellency)

Using a friction tester, a friction surface of a test cloth was abraded 1,000 times and air-dried overnight in a room at a temperature of 25° C. with a humidity of 55%, whereupon the oil repellency of the friction surface of the test cloth was evaluated.

(Water Repellency)

With respect to a test cloth, water repellency was evaluated in accordance with the spray test of JIS L1092. Water repellency was represented by five grades of 1 to 5. The larger the score, the better the water repellency. A grade marked with +(−) indicates that the property is slightly better (worse) than a standard level of the grade.

(Washing Durability of Water Repellency)

With respect to a test cloth, washing with water was repeated 20 times in accordance with the water washing method of Annex 103 of JIS L0217. After the washing, air drying was carried out overnight in a room at a temperature of 25° C. with a humidity of 55%, whereupon the water repellency of the test cloth was evaluated.

(Friction Durability of Water Repellency)

Using a friction tester, a friction surface of a test cloth was abraded 1,000 times and air-dried overnight in a room at a temperature of 25° C. with a humidity of 55%, whereupon the water repellency of the friction surface of the test cloth was evaluated.

(Heavy-Rain Durability)

With respect to a test cloth, the water repellency was evaluated by permitting rain to fall under such conditions that the amount of rainfall was 100 cc/minute, the rain water temperature was 20° C. and the rainfall time was 0 minute, 5 minutes or 10 minutes, in accordance with the method (Bundesmann test) disclosed in JIS L1092(c) method. Water repellency was represented by 5 grades of 1 to 5. The larger the score, the better the water repellency. A grade marked with +(−) indicates that the property is slightly better (worse).

(Texture)

A test cloth was left to stand for one day and night in a constant temperature and humidity room at a room temperature of 20° C.±2° C. with a humidity of 65%±2%, whereupon by a sensory evaluation, the flexibility was judged under the following standards.

◯: soft.

Δ: normal.

x: hard.

(Abbreviations)

Monomer (a):

$C_6FMA$: $C_6F_{13}C_2H_4OC(O)C(CH_3)=CH_2$.

Monomer (b):

BeA: behenyl acrylate.

Monomer (c):

55PET800: $CH_2=C(CH_3)C(O)O-[(C_2H_4O)_a(C_4H_8O)_b]-H$ (manufactured by NOF Corporation, Blemmer (registered trademark) 55PET-800, a≈10, b≈5, number-average molecular weight of $[(C_2H_4O)_a(C_4H_8O)_b]$: about 800).

Monomer (d):

VCM: Vinyl chloride.

Monomer (e):

HEMA: 2-hydroxyethyl methacrylate,

HBA: 4-hydroxybutyl acrylate,

NMAM: N-methylol acrylamide.

Monomer (f):

StA: stearyl acrylate,

PP800: $CH_2=C(CH_3)C(O)O-(C_3H_6O)_c-H$ (manufactured by NOF Corporation, Blemmer (registered trademark) PP-800, c≈13, number average molecular weight of $(C_3H_6O)_c$: about 754), PME550: $CH_2=C(CH_3)C(O)O-(C_2H_4O)_d-CH_3$ (manufactured by NOF Corporation, Blemmer (registered trademark) PME-550, d≈12, number average molecular weight of $(C_2H_4O)_d$: about 528).

Surfactant $s^1$:

PEO-30: A 10 mass % aqueous solution of polyoxyethylene oleyl ether (manufactured by Kao Corporation, Emulgen (registered trademark) E430, about 30 mol adduct of ethylene oxide).

Surfactant $s^3$:

P204: Ethylene oxide propylene oxide polymerized product (manufactured by NOF Corporation, PLONON (registered trademark) 204, the proportion of ethylene oxide: 40 mass %).

Surfactant $s^7$:

TMAC: A 63 mass % isopropyl alcohol and water mixed solution of stearyl trimethyl ammonium chloride.

Liquid Medium:

DPM: dipropylene glycol monomethyl ether,

Water: ion-exchanged water.

Molecular Weight Modifier:

DoSH: n-dodecyl mercaptan.

Polymerization Initiator:

VA061A: A 10 mass % aqueous solution of an acetate of 2,2'-azobis[2-(2-imidazolin-2-yl)propane] (manufactured by Wako Pure Chemical Industries, Ltd., VA061).

[Ex. 1]

In a glass beaker, 5.60 g of $C_6FMA$, 18.67 g of BeA, 0.25 g of 55PET800, 7.78 g of PEO-30, 0.49 g of TMAC, 0.16 g of P204, 18.67 g of DPM, 38.37 g of water, and 0.31 g of DoSH, were put and warmed for 30 minutes at 60° C., and then mixed by means of a homomixer (manufactured by Nippon Seiki Seisakusho Co., Ltd., BIO mixer) to obtain a mixed solution.

The obtained mixed solution was, while being maintained at 60° C., treated with 40 MPa by means of a high pressure emulsifier (manufactured by APV Lanier Co., Minilab) to obtain an emulsion. The obtained emulsion was put in a stainless steel reaction vessel and cooled to at most 40° C. 3.11 g of VA061A was added, and the gas phase was replaced with nitrogen, whereupon 6.60 g of VCM was added. With stirring, a polymerization reaction was conducted for 15 hours at 60° C., to obtain an emulsion of a copolymer. The proportions of units based on the respective monomers are shown in Table 2.

The emulsion of the copolymer was diluted with distilled water, to adjust the solid content concentration to 1 mass %, and then, a melamine-type curing agent (manufactured by DIC Corporation, BECKAMINE (registered trademark) M3) and an acid catalyst (manufactured by DIC Corporation, Accelerator ACX), were added so that the respective concentrations became 0.3 mass %, to obtain a water/oil repellent composition.

In the water/oil repellent composition, a dyed nylon taffeta or dyed polyester woolly taffeta was dipped and squeezed so that each wet pick-up would be 50 mass % or 30 mass %. This was dried at 110° C. for 60 seconds and then dried at 170° C. for 60 seconds, to obtain a test cloth. With respect to the test cloth, oil repellency, friction durability of oil repellency, water repellency, washing durability of water repellency, friction durability of water repellency, heavy rain durability and texture, were evaluated. The results are shown in Table 2.

[Ex. 2 to 13]

An emulsion of a copolymer was obtained in the same manner as in Ex. 1 except that the charged amounts of the respective monomers were changed to be the proportions of units based on the respective monomers as shown in Table 2 to Table 4. The proportions of units based on the respective monomers are shown in Table 2 to Table 4.

Except for using such an emulsion, a water/oil repellent composition was obtained in the same manner as in Ex. 1. In Ex. 13, two types of emulsions in Ex. 5 and Ex. 12 were mixed in a ratio 1:1 to obtain a water/oil repellent composition as shown in Table 4.

Except for using such a water/oil repellent composition, a test cloth was obtained in the same manner as in Ex. 1. With respect to the test cloth, oil repellency, friction durability of oil repellency, water repellency, washing durability of water repellency, friction durability of water repellency, heavy rain durability and texture were evaluated. The results are shown in Table 2 to Table 4.

TABLE 2

| | | | Ex. 1 | Ex. 2 | Ex. 3 | Ex. 4 |
|---|---|---|---|---|---|---|
| Proportions of units based on monomers (mass %) | (a) | C6FMA | 18 | 21 | 21 | 21 |
| | (b) | BeA | 60 | 60 | 60 | 60 |
| | (f) | StA | | | | |
| | (d) | VCM | 21.2 | 18.2 | 17.8 | 17.7 |
| | (c) | 55PET800 | 0.8 | 0.8 | 1.2 | 0.8 |
| | (f) | PP800 | | | | |
| | | PME550 | | | | |
| | (e) | HEMA | | | | |
| | | HBA | | | | 0.5 |
| | | NMAM | | | | |
| Nylon taffeta | Oil repellency | Friction 0 time | 3 | 3 | 3 | 3 |
| | | Friction 1,000 times | 2 | 3 | 2 | 2 |
| | Water repellency | Washing 0 time Friction 0 time | 5 | 5 | 5 | 5 |
| | | Washing 20 times | 4 | 4 | 4 | 4 |
| | | Friction 1,000 times | 5 | 5 | 5 | 5 |
| | Heavy rain durability | 0 minute | 5 | 5 | 5 | 5 |
| | | 5 minutes | 5 | 5 | 5 | 5 |
| | | 10 minutes | 4 | 5 | 4 | 4 |
| | Texture | — | ○ | ○ | ○ | ○ |
| Polyester wooly taffeta | Oil repellency | Friction 0 time | 2 | 2 | 3 | 2 |
| | | Friction 1,000 times | 2 | 2 | 2 | 2 |
| | Water repellency | Washing 0 time Friction 0 time | 5 | 5 | 5 | 5 |
| | | Washing 20 times | 5 | 5 | 5 | 5 |
| | | Friction 1,000 times | 5 | 5 | 5 | 5 |
| | Heavy rain durability | 0 minute | 5 | 5 | 5 | 5 |
| | | 5 minutes | 5 | 5 | 5 | 5 |
| | | 10 minutes | 5 | 5 | 5 | 5 |
| | Texture | — | ○ | ○ | ○ | ○ |

TABLE 3

| | | | Ex. 5 | Ex. 6 | Ex. 7 | Ex. 8 | Ex. 9 |
|---|---|---|---|---|---|---|---|
| Proportions of units based on monomers (mass %) | (a) | C6FMA | 18 | 21 | 14.8 | 18 | 18 |
| | (b) | BeA | 60 | 60 | 60 | 60 | 60 |
| | (f) | StA | | | | | |
| | (d) | VCM | 22 | 19 | 21 | 21.2 | 21.2 |
| | (c) | 55PET800 | | | | | |
| | (f) | PP800 | | | | 0.8 | |
| | | PME550 | | | | | 0.8 |
| | (e) | HEMA | | | 0.5 | | |
| | | HBA | | | | | |
| | | NMAM | | | 3.7 | | |
| Nylon taffeta | Oil repellency | Friction 0 time | 1+ | 1+ | 1 | 2 | 2 |
| | | Friction 1,000 times | 0 | 0 | 1 | 1 | 1 |
| | Water repellency | Washing 0 time Friction 0 time | 5 | 5 | 5 | 5 | 5 |
| | | Washing 20 times | 4 | 4 | 4 | 4 | 4 |
| | | Friction 1,000 times | 5− | 5 | 5 | 5 | 5 |
| | Heavy rain durability | 0 minute | 5 | 5 | 5 | 5 | 5 |
| | | 5 minutes | 5 | 5 | 5 | 5 | 5 |
| | | 10 minutes | 4 | 4 | 5 | 4 | 4 |
| | Texture | — | ○ | ○ | ○ | ○ | ○ |
| Polyester wooly taffeta | Oil repellency | Friction 0 time | 0 | 0 | 0 | 0 | 0 |
| | | Friction 1,000 times | 0 | 0 | 0 | 0 | 0 |
| | Water repellency | Washing 0 time Friction 0 time | 5 | 5 | 5 | 5 | 5 |
| | | Washing 20 times | 4 | 4 | 4 | 4 | 4 |
| | | Friction 1,000 times | 5 | 5 | 5 | 5 | 5 |
| | Heavy rain durability | 0 minute | 5 | 5 | 5 | 5 | 5 |
| | | 5 minutes | 5 | 5 | 5 | 5 | 5 |
| | | 10 minutes | 5 | 5 | 5 | 5 | 5 |
| | Texture | — | ○ | ○ | ○ | ○ | ○ |

TABLE 4

|  |  |  | Ex. 10 | Ex. 11 | Ex. 12 | Ex. 13 |
|---|---|---|---|---|---|---|
| Proportions of units based on monomers (mass %) | (a) | C6FMA | 21 | 21 | 80 | Ex. 5 and Ex. 12 were mixed in a ratio of 1:1 |
|  | (b) | BeA |  |  |  |  |
|  | (f) | StA | 60 | 60 |  |  |
|  | (d) | VCM | 19 | 18.2 | 19.2 |  |
|  | (c) | 55PET800 |  | 0.8 | 0.8 |  |
|  | (f) | PP800 |  |  |  |  |
|  |  | PME550 |  |  |  |  |
|  | (e) | HEMA |  |  |  |  |
|  |  | HBA |  |  |  |  |
|  |  | NMAM |  |  |  |  |
| Nylon taffeta | Oil repellency | Friction 0 time | 2 | 2 | 5 | 5 |
|  |  | Friction 1,000 times | 2 | 1 | 5 | 4 |
|  | Water repellency | Washing 0 time Friction 0 time | 5 | 5 | 5 | 5 |
|  |  | Washing 20 times | 2 | 3 | 2 | 2 |
|  |  | Friction 1,000 times | 5 | 5 | 4 | 4 |
|  | Heavy rain durability | 0 minute | 4 | 4 | 5 | 5 |
|  |  | 5 minutes | 4 | 4 | 4 | 4 |
|  |  | 10 minutes | 4 | 4 | 3 | 3 |
|  | Texture |  | ○ | ○ | x | Δ |
| Polyester wooly taffeta | Oil repellency | Friction 0 time | 1 | 0 | 5 | 4 |
|  |  | Friction 1,000 times | 1 | 0 | 4 | 4 |
|  | Water repellency | Washing 0 time Friction 0 time | 5 | 5 | 5 | 5 |
|  |  | Washing 20 times | 3 | 3 | 3 | 3 |
|  |  | Friction 1,000 times | 5 | 5 | 5 | 4 |
|  | Heavy rain durability | 0 minute | 5 | 5 | 5 | 5 |
|  |  | 5 minutes | 5 | 5 | 5 | 5 |
|  |  | 10 minutes | 5 | 5 | 5 | 5 |
|  | Texture |  | ○ | ○ | x | Δ |

INDUSTRIAL APPLICABILITY

The water/oil repellent composition of the present invention is useful as a water/oil repellent for imparting water/oil repellency to fiber products (clothing articles (sportswears, coats, jackets, work clothing, uniforms, etc.), bags, industrial materials, etc.), non-woven fabrics, leather products, wood, stone, concrete-type building materials, etc. Further, it is useful also as a coating agent for a filtration material to be used in the presence of an organic solvent liquid or its vapor, as a surface protective agent, as a coating agent for electronics, or as an antifouling coating agent. Still further, it is useful in applications to impart water/oil repellency by mixing it with polypropylene, nylon, etc., followed by molding and fiberizing.

This application is a continuation of PCT Application No. PCT/JP2016/065501, filed on May 25, 2016, which is based upon and claims the benefit of priority from Japanese Patent Application No. 2015-106994 filed on May 27, 2015. The contents of those applications are incorporated herein by reference in their entireties.

What is claimed is:

1. A water/oil repellent composition comprising a copolymer comprising units based on the following monomer (a), units based on the following monomer (b) and units based on the following monomer (c), and a liquid medium:

monomer (a): a compound represented by the following formula (1):

$$(Z-Y)_n X \quad (1),$$

wherein Z is a $C_{4-6}$ perfluoroalkyl group, Y is a $C_{1-4}$ alkylene group, n is 1, and X is at least one group represented by the following formula (3-3) represented by $$-OC(O)CR=CH_2 \quad (3-3),$$

wherein R is a hydrogen atom, a methyl group or a chlorine atom, monomer (b): a (meth)acrylate having no polyfluoroalkyl group and having an alkyl group with 20 to 24 carbon atoms, monomer (c): a compound represented by the following formula (5), $$CH_2=CR^1C(O)O-[(C_2H_4O)_a(C_4H_8O)_b]-H \quad (5),$$

wherein $R^1$ is a hydrogen atom or a methyl group, a is 10, b is 5, and a bonding order of $(C_2H_4O)$ units and $(C_4H_8O)$ units is not limited, wherein a content of $C_2H_4O$ (EO) units is from 0.05 mass % to 9.93 mass %, relative to the total mass content of units based on all monomers in the copolymer, and wherein a content of units based on the monomer (a) is from 5 to 40 mass %, a content of units based on the monomer (b) is from 40 to 94.9 mass %, and a content of units based on the monomer (c) is from 0.1 to 20 mass %, relative to the total mass content of units based on all monomers in the copolymer.

2. The water/oil repellent composition according to claim 1, wherein the copolymer further comprises units based on the following monomer (d);

monomer (d): a halogenated olefin.

3. The water/oil repellent composition according to claim 2, wherein the monomer (d) is vinyl chloride.

4. The water/oil repellent composition according to claim 2, wherein a content of units based on the monomer (d) is from 3 mass % to 25 mass %, relative to the total mass content of units based on all monomers in the copolymer.

5. The water/oil repellent composition according to claim 1, wherein the copolymer further comprises units based on the following monomer;

monomer (e): a monomer comprising a crosslinkable functional group.

6. The water/oil repellent composition according to claim 1, wherein the liquid medium is an aqueous medium.

7. A method for producing a water/oil repellent composition, which comprises polymerizing monomer components comprising the following monomer (a), the following monomer (b) and the following monomer (c) in a liquid medium in the presence of a surfactant and a polymerization initiator, to form a copolymer:

monomer (a): a compound represented by the following formula (1):

$$(Z-Y)_n X \quad (1)$$

wherein Z is a $C_{4-6}$ perfluoroalkyl group, Y is a $C_{1-4}$ alkylene group, n is 1, and X is at least one group represented by the following formula (3-3)

$$-OC(O)CR=CH_2 \quad (3-3),$$

wherein R is a hydrogen atom, a methyl group or a chlorine atom, monomer (b): a (meth)acrylate having no polyfluoroalkyl group and having an alkyl group with 20 to 24 carbon atoms, monomer (c): a compound represented by the following formula (5), $$CH_2=CR^1C(O)O-[(C_2H_4O)_a(C_4H_8O)_b]-H \quad (5),$$

wherein $R^1$ is a hydrogen atom or a methyl group, a is 10, b is 5, and a bonding order of $(C_2H_4O)$ units and $(C_4H_8O)$ units is not limited, wherein a content of $C_2H_4O$ (EO) units is from 0.05 mass % to 9.93 mass %, relative to the total mass content of units based on all monomers in the copolymer, and wherein a content of units based on the monomer (a) is from 5 to 40 mass %, a content of units based on the monomer (b) is from 40 to 94.9 mass %, and a content of units based on the monomer (c) is from 0.1 to 20 mass %, relative to the total mass content of units based on all monomers in the copolymer.

8. The method for producing a water/oil repellent composition according to claim 7, wherein the copolymer further comprises the following monomer (d):

monomer (d): a halogenated olefin.

9. The method for producing a water/oil repellent composition according to claim 7, wherein the copolymer further comprises the following monomer (e):

monomer (e): a monomer having a crosslinkable functional group.

10. The method for producing a water/oil repellent composition according to claim 7, wherein the liquid medium is an aqueous medium.

11. An article treated by using the water/oil repellent composition as defined in claim 1.

12. The article according to claim 11, wherein the article is a fiber product.

\* \* \* \* \*